F. HARVAT.
COUPLING POLE FOR TRACTION ENGINES.
APPLICATION FILED JUNE 20, 1910.
993,597.
Patented May 30, 1911.
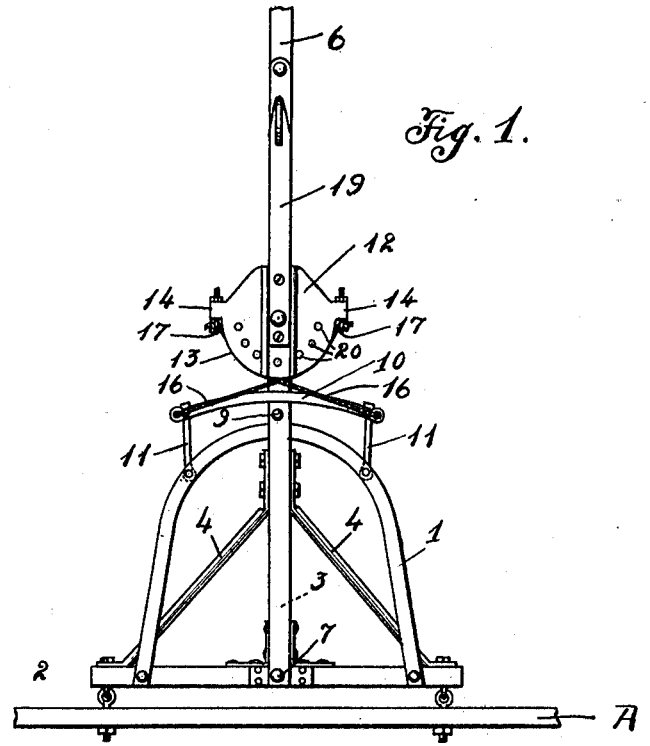
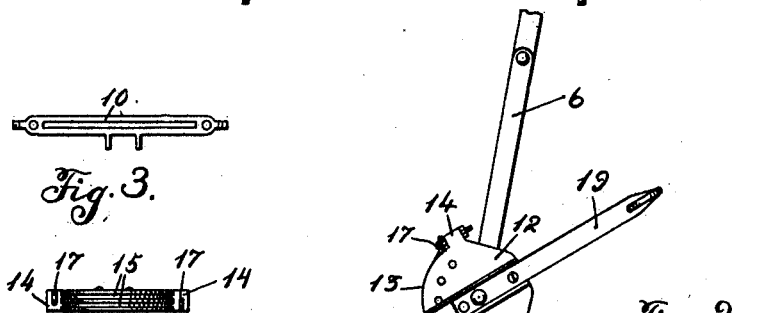
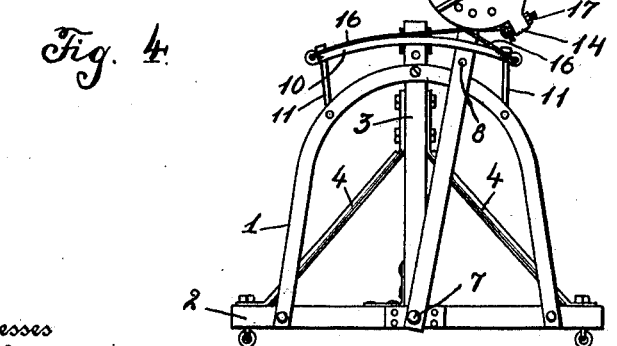
Witnesses
Inventor
Frank Harvat

UNITED STATES PATENT OFFICE.

FRANK HARVAT, OF EASTMAN, WISCONSIN.

COUPLING-POLE FOR TRACTION-ENGINES.

993,597. Specification of Letters Patent. Patented May 30, 1911.

Application filed June 20, 1910. Serial No. 567,902.

*To all whom it may concern:*

Be it known that I, FRANK HARVAT, a citizen of the United States, residing at Eastman, in the county of Crawford and State of Wisconsin, have invented certain new and useful Improvements in Coupling-Poles for Traction-Engines, of which the following is a specification.

My invention relates to devices for hitching traction engines to threshing machines, portable saw mills, and other farm machinery for transportation, and has for its object the provision of a construction by which the machine may be steered independently of the course of the traction engine to enable the engine to make sharp turns in the road when necessary without endangering ditching the trailing machine and also to assist in setting the machine in position for operation.

My invention will be described in detail hereinafter and illustrated in the accompanying drawings in which—

Figure 1 is a top plan view of my improved coupling pole in its normal position, Fig. 2, a similar view showing the pole swung to one side in the position assumed when making a turn, Fig. 3, a detail view of the slotted guide, and Fig. 4, an edge view of the guiding disk.

In the drawings similar reference characters indicate corresponding parts in all of the views.

The draft frame 1 secured to first axle A consists of the bar 2 secured to the axle and bar 3 extending forwardly from bar 2 and at right angles thereto, 4 indicating braces connecting the ends of bar 2 and bar 3.

6 indicates the coupling pole pivotally secured at 7 to the bar 2 in the middle of said bar and on a line with bar 3, pole 6 and bar 3 being formed with holes 8 that aline when the direction of draft is straight ahead and when in this position a pin or bolt 9 may be inserted in holes 8 to hold the pole in a fixed position relative to the front axle when it is not desired to steer the machine independently of the engine.

10 indicates a slotted guide secured to the free end of bar 3 and having its ends braced and secured in position by means of braces 11, the draft pole 6 being mounted in the guide.

12 indicates a disk pivotally mounted on draft pole 6 and having a portion of its circumference, as shown at 13, formed as the segment of a circle with projections 14 extending laterally from the edge of the disk at the ends of segmental portion 13. The segmental portion 13 is formed with grooves 15 to receive ropes or other flexible elements 16 having one of their ends secured to the ends of slotted guide 10 and their other ends to eyebolts 17 mounted in projections 14, said eyebolts being threaded and having nuts mounted thereon to regulate the length of the ropes 16 to compensate for shrinkage or stretching.

19 indicates a handle bar secured to disk 12 to swing it, it being understood that when the bar 19 is directly over the coupling pole 6 as shown in Fig. 1, the pole is perpendicular to axle A and the trailing machine will follow the direction of the pole, while by swinging the arm or handle bar 19 in either direction the pole 6 is swung out of perpendicular with the axle A and the machine will move at an angle to the axis of the pole.

The disk 12 is provided with a series of holes 20 concentric with its pivot, one of the holes being in alinement with handle bar or arm 19, and coupling pole 6 is formed with a hole in alinement therewith so that when desired a pin may be inserted in the disk and pole to hold the pole temporarily in the position desired to move the machine attached to axle A in a wider arc than would be described should the pole remain perpendicular to the axle.

Having thus described my invention, what I claim is—

1. In combination with the front axle of a wheeled vehicle, a draft frame secured thereto, a slotted guide secured to the draft frame, a coupling pole pivotally secured to the draft frame and slidably mounted in said slotted guide, a disk pivotally secured to the coupling pole, flexible members secured at one of their ends to the disk and at their other end to the slotted guide, and a handle bar secured to said disk.

2. In combination with the front axle of a wheeled vehicle, a draft frame secured thereto, a slotted guide secured to the draft frame, a coupling pole pivotally secured to the draft frame and mounted in said slotted guide, a disk pivotally secured to the coupling pole, said disk having a grooved segmental portion, projections extending from the disk at the ends of the segmental portion, eyebolts secured in said projections, flexible members secured at one of their ends to said eyebolts and their other ends secured to the ends of the slotted guide, and a handle bar secured to the disk to operate it.

In testimony whereof I hereto affix my signature in the presence of two witnesses.

FRANK HARVAT.

Witnesses:
C. E. ALDER,
J. F. ROACH.